United States Patent
Chen et al.

(10) Patent No.: US 6,516,196 B1
(45) Date of Patent: Feb. 4, 2003

(54) INTELLIGENT BURST CONTROL FUNCTIONS FOR WIRELESS COMMUNICATIONS SYSTEMS

(75) Inventors: Tsao-Tsen Chen, Boonton, NJ (US); Wen-Yi Kuo, Parsippany, NJ (US); Martin Howard Meyers, Montclair, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/288,364

(22) Filed: Apr. 8, 1999

(51) Int. Cl.[7] .................................................. H04Q 7/20
(52) U.S. Cl. ........................ 455/450; 455/509; 455/525
(58) Field of Search ................................ 455/450–453, 455/509, 525; 370/346, 379

(56) References Cited

U.S. PATENT DOCUMENTS

| | | | |
|---|---|---|---|
| 5,530,917 A | | 6/1996 | Andersson et al. |
| 5,652,748 A | | 7/1997 | Jolma et al. |
| 5,790,536 A | * | 8/1998 | Mahany ....................... 370/338 |
| 5,809,430 A | | 9/1998 | D'Amico |
| 5,828,662 A | | 10/1998 | Jalali et al. |
| 5,850,605 A | * | 12/1998 | Souissi ........................ 455/437 |
| 5,856,971 A | | 1/1999 | Gitlin et al. |
| 5,857,147 A | | 1/1999 | Gardner et al. |
| 6,021,122 A | * | 2/2000 | Tiedemann .................. 370/331 |
| 6,219,343 B1 | * | 4/2001 | Honkasalo ................... 370/335 |

* cited by examiner

Primary Examiner—Vivian Chin
Assistant Examiner—James Moore (57) ABSTRACT

The invention provides a novel methodology for increasing the performance of CDMA systems with packet data services by accommodating a variety of users with different rates. The invention operates to increase the spectrum efficiency of a wireless system by using an optimal transmission set of base transceiver stations and assigning proper data rates to efficiently utilize the radio resources. In particular, the invention operates to decrease interference so that the quality of data transmission in CDMA systems is advantageously maintained. Moreover, the invention operates to increase the allocation of bandwidth, particularly for high-speed data services. The invention provides a methodology to evaluate the data rates of different combinations of BTSs that may be in connection with a particular mobile station (MS), allocate an appropriate data rate for the MS and make allocation of system resources more efficient in a multi-user environment.

32 Claims, 4 Drawing Sheets

INTELLIGENT BURST CONTROL FUNCTIONS FOR WIRELESS COMMUNICATIONS SYSTEMS

RELATED APPLICATIONS

The invention is related to U.S. patent application Ser. No. 09/288,365, filed concurrently herewith, entitled METHOD FOR PREMATURE TERMINATION OF BURST TRANSMISSION IN WIRELESS COMMUNICATION SYSTEMS, U.S. patent application Ser. No. 09/288,587, entitled BURST DURATION ASSIGNMENT BASED ON FADING FLUCTUATION AND MOBILITY IN WIRELESS COMMUNICATION SYSTEMS, filed concurrently herewith, U.S. patent application Ser. No. 09/288,363, entitled SYSTEM AND METHOD FOR PREVENTION OF REVERSE JAMMING DUE TO LINK IMBALANCE IN WIRELESS COMMUNICATION SYSTEMS, filed concurrently herewith, U.S. patent application Ser. No. 09/288,368, entitled A METHOD OF QUEUE LENGTH BASED BURST MANAGEMENT IN WIRELESS COMMUNICATION SYSTEMS, filed concurrently herewith, U.S. patent application Ser. No. 09/288,006, entitled A METHOD OF DYNAMICALLY ADJUSTING THE DURATION OF A BURST TRANSMISSION IN WIRELESS COMMUNICATION SYSTEMS, filed concurrently herewith, all of which are assigned to the same assignee and are incorporated by reference herein.

FIELD OF THE INVENTION

The invention relates to wireless communication systems and, more particularly, to a burst control methodology for code division multiple access (CDMA) systems.

BACKGROUND OF THE INVENTION

Wireless communication systems have been developed to allow transmission of information signals between an originating location and a destination location. Both analog (first generation) and digital (second generation) systems have been used to transmit such information signals over communication channels linking the source and destination locations. Digital methods tend to afford several advantages relative to analog techniques, including, e.g., improved immunity to channel noise and interference, increased capacity, and improved security of communication through the use of encryption.

While first generation systems were primarily directed to voice communication, second generation systems support both voice and data applications. Numerous techniques are known in second-generation systems for handling data transmissions which have different transmission requirements. Several modulation/coding arrangements have been developed for wireless systems based on multiple access techniques, e.g., frequency division multiple access (FDMA), time division multiple access (TDMA) and code division multiple access (CDMA). In FDMA techniques, each user is allocated one or more specific sub-bands of frequency. In TDMA techniques, periodically recurring time slots are identified, and for each segment of time each user is allocated one or more time slots. CDMA systems provide reduced multiple path distortion and co-channel interference and reduce the burden of frequency/channel planning that is common with FDMA and TDMA systems.

In a CDMA system, a unique binary spreading sequence (a code) is assigned for each call to each user. Multiplied by the assigned code, the user's signal is spread unto a channel bandwidth much wider than the user signal bandwidth. The ratio of the system channel bandwidth to the user's bandwidth is commonly called the spreading gain. All active users share the same system channel bandwidth frequency spectrum at the same time. Calculating the signal-to-interference (S/I) ratio determines the connection quality of the transmission link. Given a required S/I ratio, the system capacity is proportional to the spreading gain. The signal of each user is separated from the others at the receiver by using a correlator keyed with the associated code sequence to de-spread the desired signal.

First-generation analog and second-generation digital systems were designed to support voice communication with limited data communication capabilities. Third-generation wireless systems, using wide-band multiple access technologies such as CDMA, are expected to effectively handle a large variety of services, such as voice, video, data and imaging. Among the features which will be supported by third-generation systems is the transmission of high-speed data between a mobile terminal and a land-line network. As is known, high-speed data communications is often characterized by a short transmission "burst" at a high data transmission rate, followed by some longer period of little or no transmission activity from the data source. To accommodate the bursty nature of such high-speed data services in third-generation systems, it is necessary for the communication system to assign a large bandwidth segment (corresponding to the high data rate) for the duration of the data burst from time to time. With the ability of the third generation systems to handle such bursty high-speed data transmission, throughput and delay for users can be advantageously improved. However, because of the large amount of instantaneous bandwidth required for transmission of a burst of high-speed data, the management of such bursts, and particularly the allocation of power and system resources thereto, must be handled with care to avoid unwarranted interference with other services using the same frequency allocation. Consequently, system designers need to deal with many issues in setting efficient data rates for different types of communications via a wireless link, including appropriate allocation of system resources for the bursts of data experienced with high-speed data service.

It is also well recognized that frequency spectrum is a scarce resource, and wireless communication systems are allocated a fixed, and relatively limited portion of that spectrum. Thus, an important objective in wireless system design is the achievement of high spectrum efficiency. For wireless systems serving both voice and data transmissions, there is also a need to maintain a signal-to-interference ratio (SIR) objective for each user, while, at the same time, increasing the number of users which can be concurrently supported by the system and/or accommodating higher data rates for some portion of the users.

Hence, there is a continuing need to increase the performance of communication systems by accommodating a variety of users with different data rates. Specifically, there is a need for a better burst control methodology that improves the performance of CDMA systems with high-speed data transmission services.

In addition, there is a need to increase the throughput and data rate of an individual wireless system user, particularly for high-speed data. Accordingly, there is a corollary need for a better methodology for monitoring and determining the transmission rate for data channels in such systems.

SUMMARY OF THE INVENTION

The invention provides a novel methodology for increasing the performance of CDMA systems with packet data services by accommodating a variety of users with different rates. The invention operates to increase the spectrum efficiency of a wireless system by using an optimal transmission set of base transceiver stations (BTSs) and assigning proper data rates to efficiently utilize the radio resources. The invention operates to decrease interference so that the quality of data transmission in CDMA systems is advantageously maintained. Moreover, the invention operates to increase the allocation of bandwidth, particularly for high-speed data services. The invention provides a methodology to evaluate the data rates of different combinations of BTSs that may be in connection with a particular mobile station (MS), allocate an appropriate data rate for the MS and make allocation of system resources more efficient in a multi-user environment.

The method of the invention first detects a relative signal strength received at a particular MS from the BTSs in the active set, or the set of BTSs that may be in connection with the MS. Reduced active sets, or subsets, of the active set of BTSs serving the MS are created. The subsets are possible combinations of BTSs in the active set that serve the MS. The geometry of each subset is then determined—that geometry being related to the signal-to-noise ratio (SIR) of the data channels connecting the BTSs in a subset with the MS. The power adjustment, or power per bit difference, is then calculated for each subset using the geometry. The affordable data rate is then determined for each subset, using the power adjustment and available power of the BTSs in the subset. The minimum of the data rates of all of the BTSs in a subset is chosen as the affordable data rate for that particular subset. The maximum of the affordable data rates of all the subsets is selected as the data rate for the MS.

DETAILED DESCRIPTION

The focus of early wireless systems, particularly first-generation analog systems, was primarily voice communication. With second-generation wireless systems, including CDMA, TDMA and GSM (Global System for Mobile Communications), came varying degrees of improvement in terms of voice quality, network capacity and enhanced services. However, while second-generation systems are suitable to the provision of voice, low rate data, fax and messaging, they are generally not able to effectively address requirements for high-speed mobile data rates. The evolution to third-generation wireless communications represents, essentially, a paradigm shift to the world of multimedia mobile communications, where users will have access not just to voice services but also to video, image, text, graphic and data communications. The third-generation networks are expected to provide mobile users with data rates of between 144 Kbps and 2 Mbps.

Nonetheless, in wireless networks supporting higher speed data communication applications, bandwidth and power control must be managed very carefully to avoid unacceptable interference between the higher speed applications and other applications (e.g., voice calls) being supported by the same network. As will be shown hereafter, the invention provides a novel methodology for improving power and bandwidth management in respect to such higher speed data applications, thereby providing improved operating efficiency while maintaining interference levels within an acceptable range. Although the invention will be hereafter described in terms of a preferred embodiment based on CDMA encoding of the wireless signals, it should be apparent that the methodology of the invention can also be applied for other wireless channelization arrangements, including TDMA and GSM.

Figure 1:
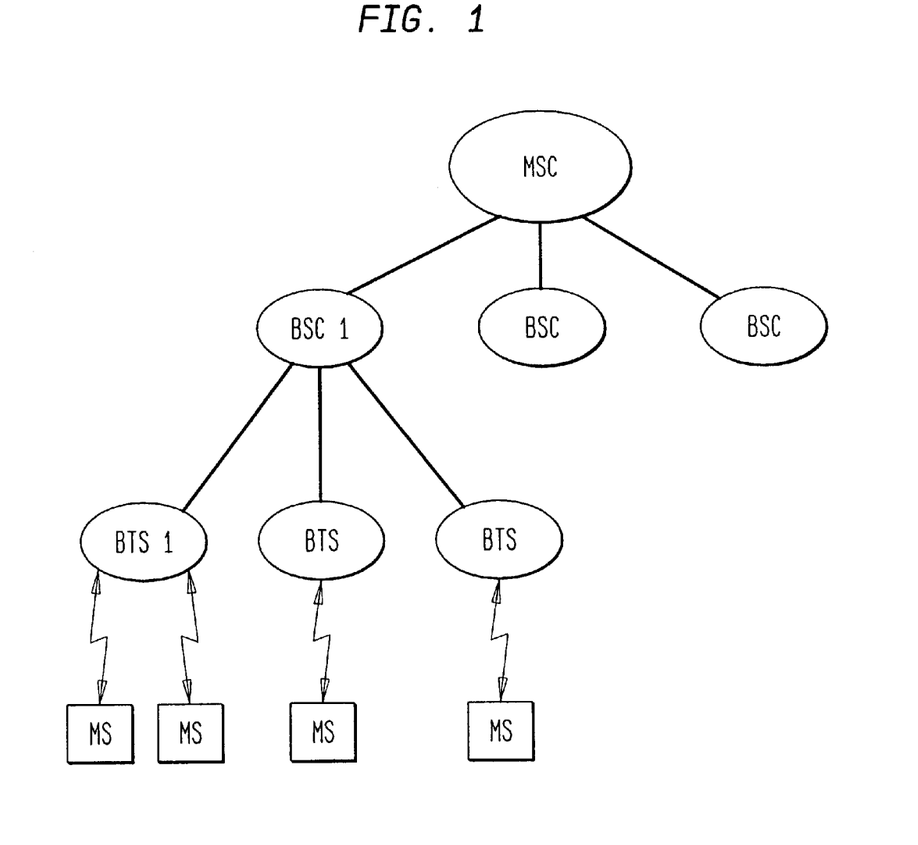
FIG. 1 illustrates a third-generation CDMA system used in the invention.

FIG. 1 provides a schematic illustration of a CDMA wireless system in which the invention may be implemented. Referring to the figure, a Mobile Switching Center (MSC) is coupled to a plurality of Base Station Controllers (or BSC, including specifically BSC 1) that perform known control functions. The MSC monitors the mobility of the users and manages necessary resources for handling and updating the location registration procedures and carries out handoff functions as MS(s) move within its control area. The MSC is involved in internetworking functions to communicate with other networks such as the PSTN (Public Switched Telephone Network) or an ISDN (Integrated Services Digital Network). The MSC may also perform switching and internetworking functions for mobile stations (MS) located in a geographically associated area. The MSC also performs call routing, control and echo control functions.

The base station controllers are in turn coupled to a plurality of base transceiver stations (or BTS, including specifically BTS 1) that perform transmitting/receiving functions. The BSC provides at least a portion of the control and management function for served BTSs. The BSC is in communication with both the BTS and the MSC. In some cases, messages can pass through the BSC transparently. The BTS consists of one or more transceivers placed at a single location and represents the RF (radio frequency) interface for served MS(s). Referring to FIG. 1, for example, BSC 1 has the control and management responsibility for a plurality of base transceiver stations that include BTS 1.

Figure 2:
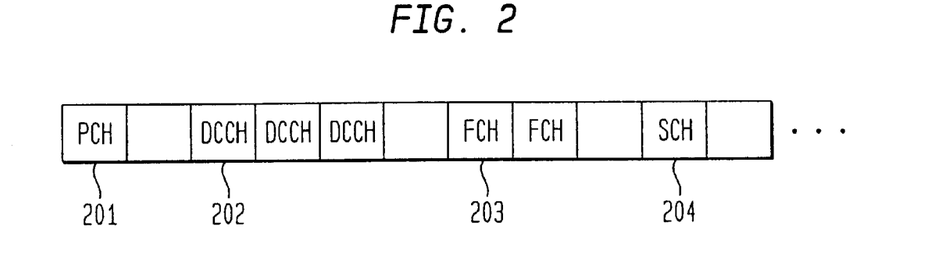
FIG. 2 illustrates the various data channels of CDMA2000, a particular third-generation system.

FIG. 2 provides a schematic depiction of the various data channels of a wireless system established according to the CDMA2000 standard (IS-95C or IS-2000), a wireless standard developed by the U.S.-based Telecommunications Industry Association. A Pilot Channel (PCH) is indicated at 201 and operates to continuously transmit an unmodulated signal in a CDMA system. A PCH provides a phase reference for coherent modulation and a means for signal strength comparisons between BTSs. A Dedicated Control Channel (DCCH) is indicated at 202 and used for the transmission of digital control information (including power control information) from a BTS to an MS. A Fundamental Channel (FCH) is shown at 203 that carries a combination of higher-level data and power control information. A Supplemental Channel (SCH) is indicated at 204 and will operate in conjunction with a DCCH and/or an FCH to provide higher data rate services (or burst data transfer) where higher-level data are transmitted.

These channels exist in both the forward link—the communication link from BTS to MS—and the reverse link—the communication link from MS to BTS—with appropriate designation. Thus, channels for the forward link include F-PCH (Forward Pilot Channel), F-DCCH (Forward Dedicated Control Channel), F-FCH (Forward Fundamental Channel) and F-SCH (Forward Supplemental Channel). Similarly, channels for the reverse link include R-PCH (Reverse Pilot Channel), R-DCCH (Reverse Dedicated Control Channel), R-FCH (Reverse Fundamental Channel) and R-SCH (Reverse Supplemental Channel).

There are significant operational differences between DCCH/FCH and SCH. The active set of BTSs—i.e., the set of BTSs in soft handoff mode with a given MS—for DCCH/FCH is for call survival purposes. Since retransmission is unacceptable for signaling and voice frames, the active set is chosen to prevent any strong interference in the active set so that the chance for a deviation from the target FER (frame error rate) is minimal. Retransmission (i.e., loss) of signaling messages produces a penalty in terms of slow action that may cause significant signal degradation or call drop. Note that DCCH/FCH have a fixed data rate at 9.6 Kbps (kilo-bits per second) or 14.4 Kbps, depending on the radio configuration of the system operation.

On the other hand, the purpose of the SCH is to provide high data rates to improve throughput and minimize the data delay—the channel only being implemented for signals having a higher data rate than can be carried by DCCH/FCH. However, data are much less sensitive to retransmission than is voice traffic. Therefore, the SCH data channel may be operated at a higher target FER, e.g., 10%. It is also possible to choose a subset of the active set for the SCH transmission. As will be shown with more particularity below, such a subset of the active set may provide a better data rate than the rate provided by using the full active set for SCH transmission. For example, when the "strongest" BTS in the active set is heavily loaded in terms of its power capacity while the other BTS in that active set are lightly loaded, use of the less heavily loaded BTSs for the SCH may result in a better data rate.

Use of such a reduced active set is also likely to result in bandwidth utilization efficiencies. While the DCCH/FCH channel always uses the full active set of BTSs, based on call survival criteria, the connection bandwidth for that channel is normally 9.6 Kbps. Thus, even for an active set of three or more BTSs, the total bandwidth requirement for the DCCH/FCH channel is relatively small. However, for an SCH, which may have a rate of 460.8 Kbps or even 921.6 Kbps, parallel connections during a 3-way or 4-way soft handoff occupy a lot more bandwidth for connections to all BTSs in the active set. This can create congestion problems and/or network inefficiencies. Reduced active set operation for the SCH channel will result in a more efficient allocation of system resources. In terms of duration that a channel is in use for transmitting data, DCCH/FCH usually persist for a much longer time than SCH. That is, SCH is assigned on an as-needed basis and therefore can be set up and released quickly according to data activity.

Figure 3:
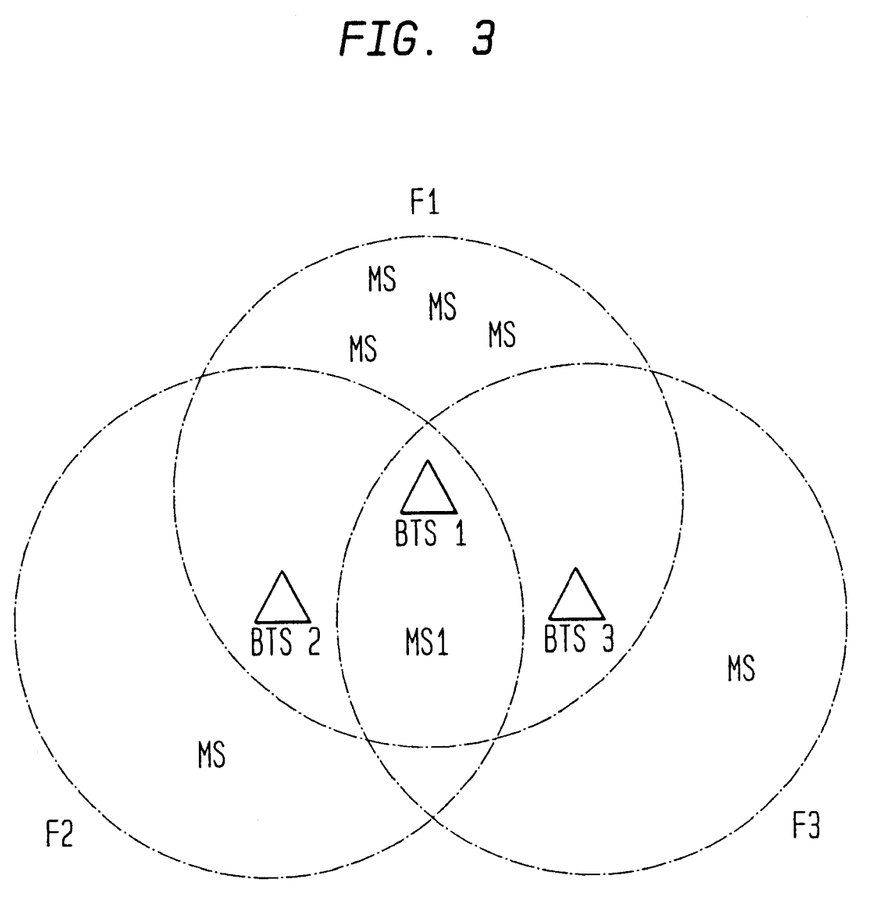
FIG. 3 illustrates the operation of the methodology of the invention.

FIG. 3 illustrates an application of the methodology of reduced active set operation in a CDMA system. As can be seen, the figure depicts three BTSs having overlapping coverage areas. It is assumed for purposes of the following discussion that the three BTSs constitute the active set of BTS1, BTS2 and BTS3. Each BTS has a specific power capacity and serves a specific geographical area, or cell. Referring to the figure, BTS1 covers a cell having a boundary indicated by F1, which is the geographical area in which BTS1 can maintain communication with a served MS. Similarly, BTS2 has a cell boundary indicated by F2 and the boundary for the cell associated with BTS3 is indicated by F3. Any MS that is present in the cell will usually communicate with that cell's BTS. However, with soft handoff, the MS will also maintain communication with other BTSs as well, generally the one to three such BTSs providing next lower signal strengths to the MS.

In the general case, the primary communication path is chosen as that between the BTS and the MS which provides the strongest signal strength at the MS. However, this case may result in sub-optimal efficiency and power utilization for the SCH channel if the power capacity of that primary BTS is substantially subscribed by another MS (or a plurality thereof) in the same cell, and, therefore, has insufficient power to effectively handle the load requirement of the additional MS.

Illustratively referring again to FIG. 3, note that even though MS1 is in cell F1, there are four other MS(s) in the same cell. Accordingly, BTS1 is heavily loaded because of the high number of MS(s) in the cell. In contrast, BTS2 has only one additional MS in its cell, and so does BTS3. In this case, it is likely that an assignment of SCH for MS1 to a reduced active set—BTS2, BTS3 or both—would provide a more effective signal path for that channel, even if the signal path between BTS1 and MS1 has a stronger signal strength than the path from MS1 to the other BTSs, particularly if one or both of the other BTSs are idle. Therefore, according to the invention, in order to maximize transmission efficiency without power overload, the system chooses a reduced active set from an active set of BTSs for the SCH channel of a given MS in the geographical area.

In addition, once a determination of the reduced active set of BTSs has been made, according to the method of the invention, it is not necessary to assign the maximum power capacity available for each MS. Based on the measurement of relative signal strength at an MS with respect to the BTSs in the active set, an affordable data rate is determined so that throughput efficiency and power utilization are both maximized without sacrificing data transmission quality.

Figure 4:
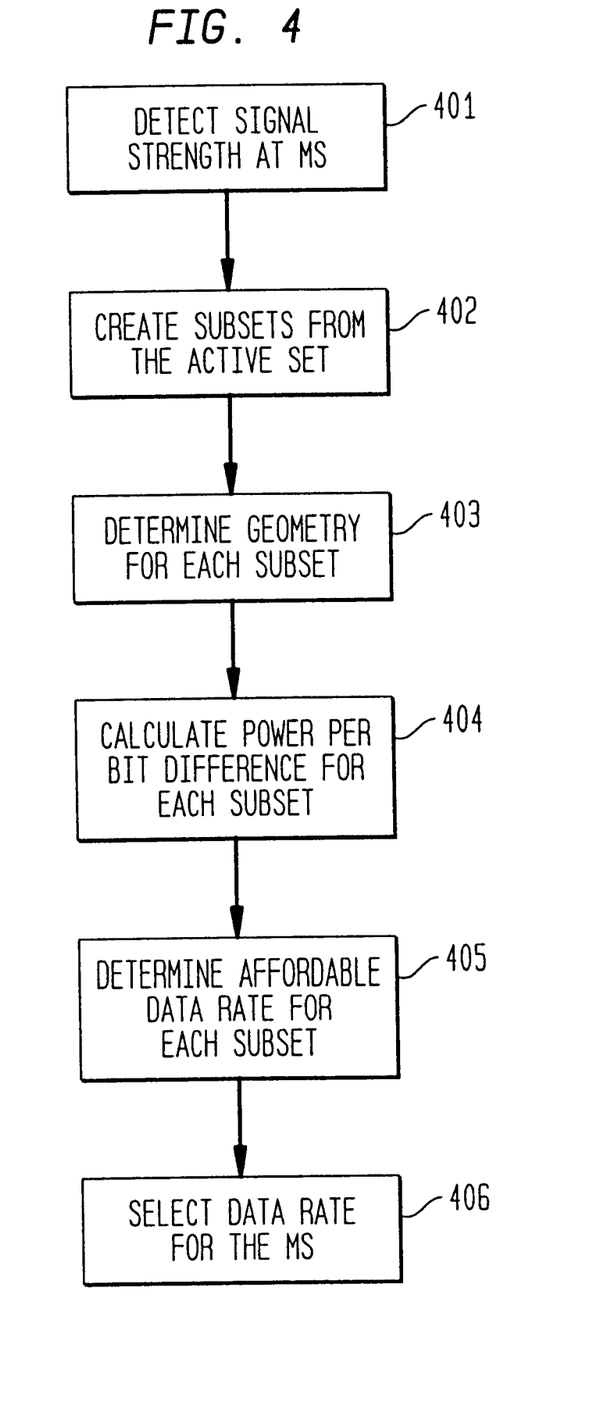
FIG. 4 is a flow diagram of the methodology of the invention.

Referring to FIG. 4, which shows the basic steps of the method of the invention in flow chart form, the method of the invention first detects in Step 401 a relative signal strength received at a particular MS from the BTSs in the active set. The active set is the set of BTSs that may be in connection with the MS. In Step 402, reduced active sets, or subsets of the active set of BTSs serving the MS are created. The subsets are possible combinations of BTSs in the active set that serve the MS, including a subset that is the full active set. The geometry of each subset is then determined in Step 403—that geometry being related to the signal-to-noise ratio (SIR) of the data channels connecting the BTSs in a subset with the MS. The power adjustment, or power per bit difference, is then calculated for each subset in Step 404 using the geometry. The affordable data rate is then determined for each subset in Step 405 using the power adjustment and available power of the BTSs in the subset. The minimum of the data rates of all of the BTSs in a subset is chosen as the affordable data rate for that particular subset. In Step 406, the maximum of the affordable data rates of all the subsets is selected as the data rate for the MS. A description of the associated steps are detailed below.

Referring to Step 401 of FIG. 4, in order to quantify the difference in affordable data rates that different reduced active sets (or subsets) can provide, the power requirement for each channel rate needs to be determined. In the forward link, the base station control function (usually the BSC) needs to determine the best assignment for the data user while maintaining system operations without excessive interference or power overload. Before each assignment process, the BTS commands the MS to report updated measurement on the relative pilot strength. The command for pilot measurement report can be performed by existing air interface messaging platforms such as PMRO (Pilot Measurement Request Order) on a per burst basis. PMRO is a standard mechanism for the MS to report the relative signal strength.

Referring to Step 402 of FIG. 4, reduced active sets, or subsets, of the active set of BTSs that may be in connection with the MS are created for evaluating an appropriate data rate. Subsets are possible combinations of BTSs of the active set that have different levels of signal strength. Although using the strongest BTSs (in terms of signal strength) viewed at the MS to transmit forward data channel information will be most power efficient, i.e., required power per bit is lower, such usage may not yield the highest data rate. In fact, if the strongest BTS is heavily loaded, using second and even third strongest BTSs alone may yield a better data rate.

It is therefore advantageous to choose the best subset of the active set (including the choice of the full active set) to achieve the highest data rate. According to the principle of the invention, all or at least the major subsets of the active set of BTSs are evaluated at the outset of the burst assignment process and the subset that yields the highest data rate is chosen. For instance, the following six subsets in the forward link may be created (as in Step 402) to allow the burst assignment process to calculate the affordable data rate of each subset, upon which the highest data rate is selected:

A. Using the strongest BTS only

B. Using the 2nd strongest BTS only

C. Using the strongest and 2nd strongest BTSs only

D. Using the strongest and 3rd strongest BTSs only

E. Using the 2nd strongest and 3rd strongest BTSs only

F. Using the strongest, 2nd strongest and 3rd strongest BTSs

Note that if the user's DCCH/FCH (Dedicated Control Channel/Fundamental Channel) is in 3 or more way soft handoff, then all subsets above are valid, but if the user's DCCH/FCH is in 2-way soft handoff, then only subsets A–C are valid. When the user's DCCH/FCH is in simplex, only subset A is valid.

Referring to Step 403 of FIG. 4, the relative signal strength (pilot $E_c/I_o$) received at the MS with respect to a particular subset of BTSs is utilized for geometry calculation for that particular subset. The geometry is a metric to approximate the SIR of a particular BTS or a plurality of BTSs in connection with the MS for the forward link channels. In general, the geometry of a BTS is a function of the power of the BTS and the interference associated with the BTS-MS transmission path. The relative attenuation, i.e., the net effect of path loss and shadow fading, among different BTSs and the forward loading at each BTS are ascertained. With that information, the geometry for each reduced active set (or subset) is evaluated as:

Geometry=(Sum of Power from BS(s) in Reduced Active Set)/(Sum of All Other Power)

The detailed geometry is defined as follows:

$$\text{Geometry} = \frac{\sum_{BS\ k\ actively\ Tx\ that\ channel} \text{Power from } BS\ k}{\text{Interference} + \sum_{BS\ m\ doesn't\ Tx\ that\ channel} \text{Power from } BS\ m} = \frac{\sum_{k \in Tx\ set} G_k}{1 - \sum_{k \in Tx\ set} G_k} \quad (1)$$

where $$G_k = \left(\text{pilot}\frac{E_c}{I_o}\right)_{BS\_k} \cdot \frac{\text{loading}_{BS\_k}}{\text{pilot\_ratio}_{BS\_k}}$$

is the ratio of the actual received power at MS from the $k^{th}$ BTS to $I_o$ (total received power at MS). Based on the formula, the geometry of the active set is calculated based on:

Geometry=(sum of power of the active set)/(other)

where sum of power of the active set is the total power of all base transceiver stations in the active set, and other is the sum of all other power received by the mobile station. The geometry of a reduced active set is calculated based on:

Geometry=(reduced active set)/(other BTSs in the active set+ other)

where reduced active set is the total power of all base transceiver stations in the reduced active set, other BTSs in the active set is the power of all other base transceiver stations in the active set, and other is the sum of all other power received by the mobile station.

For instance, in an operating scenario with an active set of base transceiver stations {A, B, C}, the geometry of the full active set is defined as follows:

Geometry$_{full\ active\ set}$=$(S_A+S_B+S_C)$/other where other represents the sum all other power received.

In an operating scenario of a reduced active set of {A}, the geometry of the reduced active set is defined as follows:

Geometry$_{reduced}$=$S_A/(S_B+S_C$+other)

Microchips or DSP (digital signal processing) functionality embedded in the BSC can perform the calculations in the algorithms disclosed hereinabove. In the alternative, the BSC can locate a value in stored lookup table(s) that is associated with the particular BTS-MS transmission path at the time. If the wireless system has more layers in the fixed network, where there are primary BTSs and sub BTSs, the processing capability can reside in either the primary or the sub-BTS.

Referring to Step 404 of FIG. 4, the power estimation adjustment, or power per bit difference, is calculated for each subset of BTSs, as follows:

$$\text{adjustment} = 10^{\left\{\text{slope\_t}\ re\ \log_{10}\left(\frac{Active\ set\ geometry}{Reduced\ active\ set\ geometry}\right)+0.1\cdot\text{OFFSET\_FP}\right\}} \quad (2)$$

where slope_t and OFFSET_FP are parameters to account for the power requirement difference due to the difference in geometry, and the power requirement difference resulting from different target FER and coding structure. Note that, instead of using Equation (2), one can build a look-up table (as described hereinabove) to evaluate the power estimation adjustment based on the given inputs of geometries, target FER, coding structure, etc.

Referring to Step 405 of FIG. 4, the affordable data rate of a subset can be calculated in the manner shown below. The affordable data rate is determined for each subset using the power adjustment and available power of the BTSs in the subset. The minimum of the data rates of all of the BTSs in a subset is chosen as the affordable data rate for that particular subset. The affordable data rate of a subset in the forward link is calculated as follows:

$$\text{affordable data rate} = \min_{\text{reduced active set}} \left\{ \frac{1 - \text{headroom} - \text{loading} + P_{data}}{P_{DCCH} \cdot \text{adjustment}} \right\} \cdot 9600 \text{ (bps)} \quad (3)$$

where $P_{data}$=data channel power mean, and $P_{DCCH}$=DCCH power mean+Fw__scal__std$\sqrt{\text{DDCH power variance}}$ wherein $\sqrt{\text{DDCH power variance}}$ is the standard power deviation.

Note that the minimum operation is applied to the reduced active sets, or subsets, in the forward link. The adjustment is different depending on the reduced active set or subset of BTSs. The headroom for forward loading is a parameter to account for a true operation limit. Fw__scal__std is a scaling parameter to include the power variation. The headroom acts as power loading protection in the event of power deviation. For example, if an MS has a 90 percent power assignment, as opposed to a 100 percent power assignment, there is room for overloading control if the power assignment deviates from the 90 percent threshold.

It is noted that the affordable data rates of the subsets of BTSs are the rates adopted for operating the system and are possible combinations of the data rates defined in the CDMA2000 standard, which are multiples of 9.6 Kbps or 14.4 Kbps. A specific operation can select a combination of the data rates, e.g., using the rates of 57.6 Kbps and 460 Kbps only for the SCH.

Note, however, that, while alternate methods may be used to evaluate the affordable data rate, any such method is intended to be within the contemplation of the invention. As will be apparent to those skilled in the art, the thrust of the method of the invention is directed to a determination of the best subset of the active set that yields the highest data rate.

Referring to Step 406 of FIG. 4, the maximum of the affordable data rates of all of the reduced active sets (or subsets) is selected to be the data rate for the particular BTS-MS path for maximum throughput and loading efficiency.

To illustrate the methodology of the invention, consider an exemplary reduced active set (or subset) of BTSs {A, B}. When only A is active, the system requires power consumption of $P_1$. The corresponding data rate $R_1=L_A/P_1$, where $L_A$ is the remaining power loading of A. When only B is active, the system requires power consumption of $P_2$. The corresponding data rate $R_2=L_B/P_2$, where $L_B$ is the remaining power loading of B. When both A and B are active, the system requires power consumption of $P_3$. In calculating the affordable data rate, the minimum of $L_A/P_3$ and $L_B/P_3$ is first taken, namely $R_3=\min\{L_A/P_3 \text{ and } L_B/P_3\}$. The data rate for the BTS-MS transmission path associated with the subset of BTSs {A, B} is the maximum of $R_1$, $R_2$ and $R_3$, namely $R_{final}=\max\{R_1, R_2, R_3\}$.

Three examples are given below for selection of a reduced active set, or subset, according to the method of the invention. They are illustrated in Table 1. Case 1 represent the case that the strongest BTS (in terms of signal strength) is heavily loaded while the $2^{nd}$ and $3^{rd}$ strongest BTSs are lightly loaded. Case 2 is similar to Case 1 except the $2^{nd}$ and $3^{rd}$ strongest BTSs are moderately loaded. Case 3 represents the scenario that the $2^{nd}$ strongest BTS is heavily loaded but the other two BTSs are lightly loaded. Table 2 illustrates the advantages (in terms of data rates) of using a reduced active set of BTSs over the full active set.

TABLE 1

Scenarios of Examples Considered

|  |  | BTS1 | BTS2 | BTS3 | $I_{oc}$ (Sum of others) |
|---|---|---|---|---|---|
| Case 1 | Attenuation (dB) | 0 | 1 | 3 | 15 |
|  | Loading | 0.95 | 0.4 | 0.4 |  |
| Case 2 | Attenuation (dB) | 0 | 1 | 3 | 15 |
|  | Loading | 0.95 | 0.7 | 0.6 |  |
| Case 3 | Attenuation (dB) | 0 | 2 | 4 | 15 |
|  | Loading | 0.5 | 0.95 | 0.5 |  |

TABLE 2

Instantaneous Rate Provided by Different Selections of Reduced Active Set

|  | Selection of Reduced Active Set | Max Instantaneous Rate (scaled from 9.6 Kbps, 1% FER) in Pedestrian Model A channel |
|---|---|---|
| Case 1 | {BTS1, BTS2, BTS3} | 136.6 Kbps |
|  | {BTS2, BTS3} | 337.1 Kbps |
| Case 2 | {BTS1, BTS2, BTS3} | 142.6 Kbps |
|  | {BTS2, BTS3} | 190.7 Kbps |
| Case 3 | {BTS1, BTS2, BTS3} | 135.5 Kbps |
|  | {BTS1, BTS3} | 426.8 Kbps |

Microchips or DSP (digital signal processing) functionality embedded in the BSC can perform the calculations in the algorithms disclosed hereinabove. In the alternative, the BSC can locate a value in stored lookup table(s) that is associated with the particular MS/BTS combination at the time. The lookup table outputs the power adjustment which can be used for determining the affordable data rate.

Figure 5:
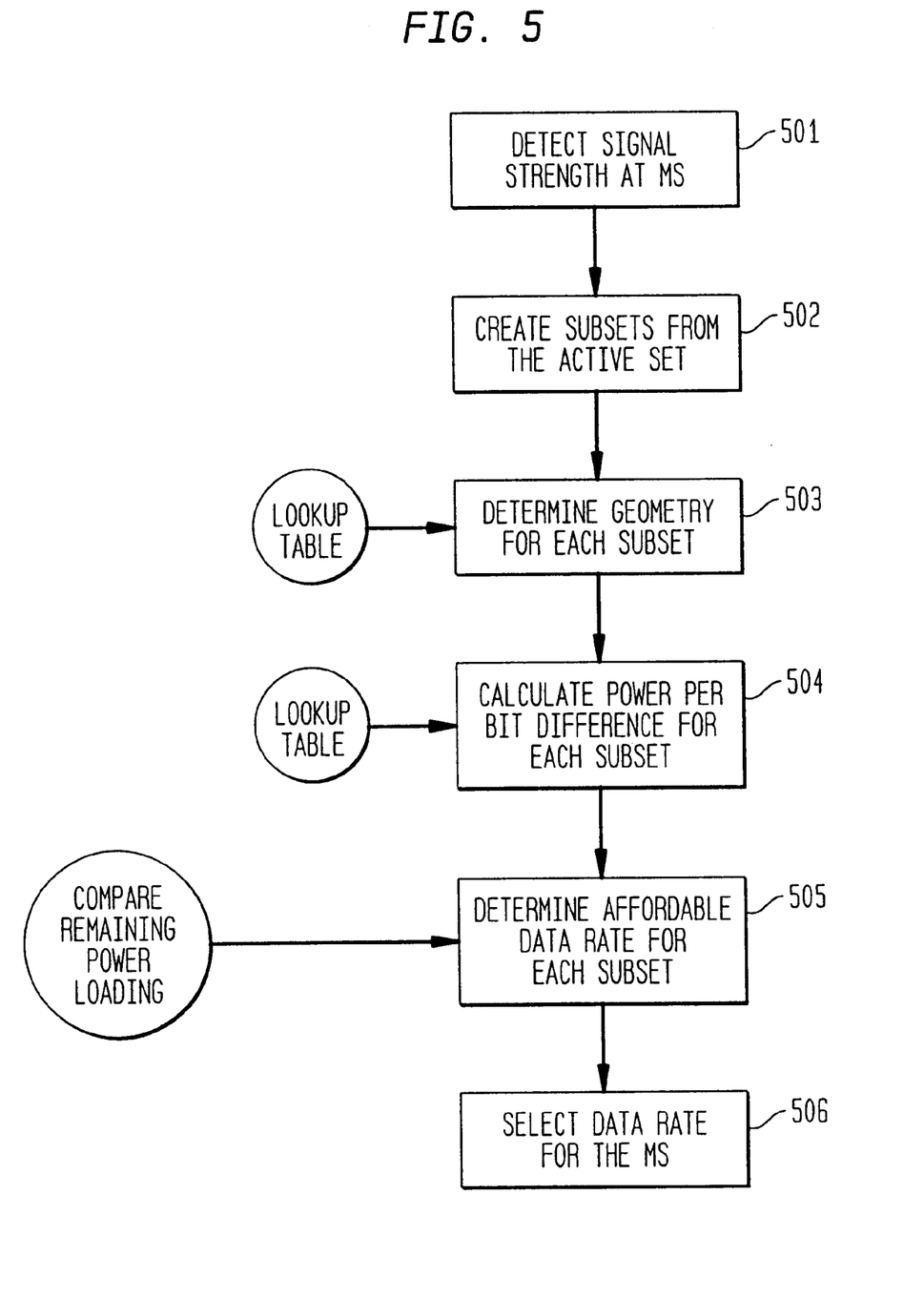
FIG. 5 is a flow diagram illustrating the method of the invention implemented with lookup table(s).

Referring to FIG. 5, implementing the method of the invention with lookup tables is similar to implementing the same with Equations (1), (2) and (3). Referring to the figure, Steps 501 and 502 are similar to the method of the invention as depicted in FIG. 4. Referring to the figure, the method of the invention first detects in Step 501 a relative signal strength received at a particular MS from the BTSs in the active set. In Step 502, reduced active sets, or subsets of the active set of BTSs serving the MS are created. With the aid of the lookup tables, the geometry and the power adjustment (or power per bit difference) are determined in Steps 503 and 504. The power adjustment is determined with the aid of lookup tables that store the relevant power loading values associated with a particular subset of BTSs. Using the lookup tables, the wireless system outputs the power needed for the affordable data rate of a subset by comparing and evaluating the remaining power loading in the BTSs of that subset. The affordable data rate for each subset is then determined in Step 505. The minimum of the data rates of all of the BTSs in a subset is chosen as the affordable data rate for that particular subset. The maximum of the affordable data rates of all the subsets is selected as the data rate for the MS in Step 506.

Those skilled in the art will recognize that there are many configurations of wireless systems not specifically described herein but for which the methodology of the invention may be applied. Although the invention is described in its preferred embodiments, it is not intended to limit the invention to the precise embodiments disclosed herein. In particular, the invention can be utilized for third-generation mobile or personal communication systems that offer a multitude of data services in different operating scenarios, such as telephony, teleconference, voice mail, program sound, video telephony, video conference, remote terminal, user profile editing, telefax, voiceband data, database access, message broadcast, unrestricted digital information, navigation, location and Internet access services. The burst control methodology of the invention can also be utilized in second-generation systems, or any system that has burst data transfer capability.

Accordingly, this description is to be construed as illustrative only. Those skilled in this technology can make various alterations and modifications without departing from the scope and spirit of this invention. Therefore, the scope of the invention shall be defined and protected by the following claims and their equivalents. The invention is to be accorded the widest scope consistent with the principles and novel features disclosed herein. The exclusive use of all modifications within the scope of the claims is reserved.

We claim:

1. A resource allocation method for a wireless communication system having a plurality of base transceiver stations operative to serve a plurality of mobile stations and wherein an active set of base transceiver stations is determined with respect to a mobile station, the method comprising the steps of:

creating a plurality of reduced active sets from combinations of base transceiver stations in the active set;

determining an affordable data rate for each of the reduced active sets; and selecting a data rate from the affordable data rate of each of the reduced active sets.

2. The method in claim 1, further comprising the step of evaluating a power parameter of base transceiver stations in the at least one reduced active set.

3. The method in claim 1, further comprising the step of detecting a relative signal strength received at the mobile station from a reduced active set of base transceiver stations, wherein the reduced active set is selected from the group consisting of:

a strongest set only;

a second strongest set only;

the strongest set and the second strongest set only;

the strongest set and a third strongest set only;

the second strongest set and the third strongest set only; and the strongest set, the second strongest set and the third strongest set wherein the strongest set, the second strongest set and the third strongest set comprises base transceiver stations from the active set.

4. The method in claim 1, further comprising the step of calculating a power adjustment for the at least one reduced active set, wherein the affordable data rate of the at least one reduced active set is calculated based on the power adjustment.

5. The method in claim 4, further comprising the step of creating at least one lookup table established to receive input parameters of geometry, frame error rate and coding structure, wherein the power adjustment is determined from the at least one lookup table.

6. The method in claim 1, wherein the affordable data rate of a reduced active set is a minimum data rate of all of the data rates of base transceiver stations in the reduced active set.

7. The method in claim 1, wherein the selected data rate is a maximum affordable data rate of all of the affordable data rates.

8. the method in claim 1, further comprising the step of creating at least one lookup table established to receive input parameters of geometry, frame error rate and coding structure, wherein the affordable data rate is determined from the at least one lookup table.

9. The method in claim 1 wherein the system is a CDMA system having a forward link and a reverse link, the system having burst transmission capability.

10. A resource allocation method for a wireless communication system having a plurality of base transceiver stations operative to serve a plurality of mobile stations and wherein an active set of base transceiver stations is determined with respect to a mobile station, the method comprising the steps of:

creating at least one reduced active set from combinations of base transceiver stations in the active set;

determining an affordable data rate for each of the at least one reduced active set; and selecting a data rate from the affordable data rate of each of the at least one reduced active set, further comprising the step of calculating a geometry for each of the at least one reduced active set of base transceiver stations, wherein the geometry is a metric that approximates a signal-to-interference ratio.

11. The method in claim 10 wherein the geometry of the at least one reduced active set is calculated based on:

$$\text{geometry} = (\text{sum of power of the reduced active set})/(\text{other})$$

wherein sum of power of the reduced active set is total power of all base transceiver stations in the at least one reduced active set received by the mobile station, and other is a sum of all other power received by the mobile station.

12. The method in claim 10 wherein the geometry of a reduced active set is calculated based on:

$$\text{geometry} = (\text{reduced active set})/(\text{other BTSs in the active set} + \text{other})$$

wherein reduced active set is total power of all base transceiver stations in the reduced active set received by the mobile station, other BTSs in the active set is the power of all other base transceiver stations in the active set, and other is a sum of all other power received by the mobile station.

13. The method in claim 10, further comprising the step of creating at least one lookup table established to receive input parameters, wherein the geometry is determined from the at least one lookup table.

14. A resource allocation method for a wireless communication system having a plurality of base transceiver stations operative to serve a plurality of mobile stations and wherein an active set of base transceiver stations is determined with respect to a mobile station, the method comprising the steps of:

creating at least one reduced active set from combinations of base transceiver stations in the active set;

determining an affordable data rate for each of the at least one reduced active set; and selecting a data rate from the affordable data rate of each of the at least one reduced active set, further comprising the step of calculating a power adjustment for at least one reduced active set, wherein the affordable data rate of the at least one reduced active set is calculated based on the power adjustment, wherein the power adjustment is calculated based on:

$$\text{adjustment} = 10^{\left\{\text{slope\_t } re \, \log_{10}\left(\frac{\text{Active\_set\_geometry}}{\text{Reduced\_active\_set\_geometry}}\right)+0.1\cdot\text{OFFSET\_FP}\right\}}$$

wherein Active set geometry is a geometry for the active set of base transceiver stations corresponding to the mobile station, Reduced active set geometry is the geometry of a reduced active set of base transceiver stations, and slope_t and OFFSET_FP are predetermined parameters.

15. The method in claim 14, wherein the affordable data rate is determined based on:

affordable data rate =

$$\min_{\text{reduced active set}}\left\{\frac{1 - \text{headroom} - \text{loading} + P_{\text{data}}}{.. P_{\text{DCCH}} \cdot \text{adjustment}}\right\} \cdot 9600 \text{ (bps)}$$

wherein $P_{\text{data}}$ is a data channel power mean, and $$P_{\text{DCCH}} = \text{DCCH power mean} + Fw\_scal\_std\sqrt{\text{DCCH power variance}}$$

wherein DCCH power mean is a specific power mean, Fw_scal_std is a scaling parameter, loading is power loading, $\sqrt{\text{DCCH power variance}}$ is a standard deviation of power, adjustment is the calculated power adjustment, and headroom is a predetermined parameter.

16. A wireless communication system having a plurality of base transceiver stations operative to serve a plurality of mobile stations and wherein an active set of base transceiver stations is determined with respect to a mobile station, the system comprising:
   means for creating a plurality of reduced active sets from combinations of base transceiver stations in the active set;
   means for determining an affordable data rate for each of the reduced active sets; and
   means for selecting a data rate from the affordable data rate of each of the reduced active sets.

17. The system in claim 16, further comprising means for evaluating a power parameter of base transceiver stations in the at least one reduced active set.

18. The system in claim 16, further comprising the means for detecting a relative signal strength received at the mobile station from a reduced active set of base transceiver stations, wherein the reduced active set is selected from the group consisting of:
   a strongest set only;
   a second strongest set only;
   the strongest set and the second strongest set only;
   the strongest set and a third strongest set only;
   the second strongest set and the third strongest set only; and
   the strongest set, the second strongest set and the third strongest set
   wherein the strongest set, the second strongest set and the third strongest set comprises base transceiver stations from the active set.

19. The system in claim 16, further comprising the means for calculating a power adjustment for the at least one reduced active set, wherein the affordable data rate of the at least one reduced active set is calculated based on the power adjustment.

20. The system in claim 19, further comprising at least one lookup table established to receive input parameters of geometry, frame error rate and coding structure, wherein the power adjustment is determined from the at least one lookup table.

21. The system in claim 16, wherein the affordable data rate of a reduced active set is a minimum data rate of all of all of the data rates of base transceiver stations in the reduced active set.

22. The system in claim 16, wherein the selected data rate is a maximum affordable data rate of all of the affordable data rates.

23. The system in claim 16, further comprising at least one lookup table established to receive input parameters of geometry, frame error rate and coding structure, wherein the affordable data rate is determined from the at least one lookup table.

24. The system in claim 16 wherein the system is a CDMA system having a forward link and a reverse link, the system burst transmission capability.

25. A wireless communication system having a plurality of base transceiver stations operative to serve a plurality of mobile stations and wherein an active set of base transceiver stations is determined with respect to a mobile station, the system comprising:
   means for creating at least one reduced active set from combinations of base transceiver stations in the active set;
   means for determining an affordable data rate for each of the at least one reduced active set; and
   means for selecting a data rate from the affordable data rate of each of the at least one reduced active set,
   further comprising means for calculating a geometry for each of the at least one reduced active set of base transceiver stations, wherein the geometry is a metric that approximates a signal-to-interference ratio.

26. The system in claim 25 wherein the geometry of the at least one reduced active set is calculated based on:

geometry=(sum of power of the reduced active set)/(other)

wherein sum of power of the reduced active set is total power of all base transceiver stations in the at least one reduced active set received by the mobile station, and other is a sum of all other power received by the mobile station.

27. The system in claim 25 wherein the geometry of a reduced active set is calculated based on:

geometry=(reduced active set)/(other BTSs in the active set+other)

wherein reduced active set is total power of all base transceiver stations in the reduced active set received by the mobile station, other BTSs in the active set is the power of all other base transceiver stations in the active set, and other is a sum of all other power received by the mobile station.

28. The system in claim 25, further comprising at least one lookup table established to receive input parameters, wherein the geometry is determined from the at least one lookup table.

29. A wireless communication system having a plurality of base transceiver stations operative to serve a plurality of mobile stations and wherein an active set of base transceiver stations is determined with respect to a mobile station, the system comprising:
   means for creating at least one reduced active set from combinations of base transceiver stations in the active set;
   means for determining an affordable data rate for each of the at least one reduced active set; and means for selecting a data rate from the affordable data rate of each of the at least one reduced active set, further comprising the means for calculating a power adjustment for the at least one reduced active set, wherein the affordable data rate of the at least one reduced active set is calculated based on the power adjustment, wherein the power adjustment is calculated based on:

$$\text{adjustment} = 10^{\left\{\text{slope\_t} \, re \, \log_{10}\left(\frac{\text{Active\_set\_geometry}}{\text{Reduced\_active\_set\_geometry}}\right) + 0.1 \cdot \text{OFFSET\_FP}\right\}}$$

wherein Active set geometry is a geometry for the active set of base transceiver stations corresponding to the mobile station, Reduced active set geometry is the geometry of a reduced active set of base transceiver stations, and slope_t and OFFSET_FP are predetermined parameters.

30. The system in claim 29, wherein the affordable data rate is calculated based on;

affordable data rate =

$$\min_{\text{reduced active set}} \left\{ \frac{1 - \text{headroom} - \text{loading} + P_{\text{data}}}{.. P_{DCCH} \cdot \text{adjustment}} \right\} \cdot 9600 \text{ (bps)}$$

wherein $P_{data}$ is a data channel power mean, and $P_{DCCH}$=DCCH power mean+$Fw\_scal\_std\sqrt{\text{DDCH power variance}}$ wherein DCCH power mean is a specific power mean, Fw_scal_std is a scaling parameter, loading is power loading, $\sqrt{\text{DDCH power variance}}$ is a standard deviation of power, adjustment is the calculated power adjustment, and headroom is a predetermined parameter.

31. A resource allocation method for a wireless communication system wherein a plurality of base transceiver stations is in communication with a mobile station at certain times and wherein an active set of base transceiver stations including more than one base transceiver station is determined with respect to a mobile station, the method comprising the steps of:

creating a plurality of reduced active sets from combinations of base transceiver stations in the active set, determining an affordable data rate for each reduced active set, said affordable data rate being a function of available power in each base transceiver station in the reduced active set; and selecting a data rate from the affordable data rates for the reduced active sets.

32. The method of claim 31 wherein at least one of the plurality of reduced active sets includes more than one base transceiver station.

* * * * *